(12) United States Patent
Peura

(10) Patent No.: US 9,759,303 B2
(45) Date of Patent: Sep. 12, 2017

(54) VEHICLE DIFFERENTIAL DISCONNECT ASSEMBLY

(71) Applicant: GKN Driveline North America, Inc., Auburn Hills, MI (US)

(72) Inventor: Brent Peura, Farmington, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 14/784,077

(22) PCT Filed: May 14, 2014

(86) PCT No.: PCT/US2014/038001
§ 371 (c)(1),
(2) Date: Oct. 13, 2015

(87) PCT Pub. No.: WO2014/186466
PCT Pub. Date: Nov. 20, 2014

(65) Prior Publication Data
US 2016/0053880 A1    Feb. 25, 2016

Related U.S. Application Data

(60) Provisional application No. 61/823,280, filed on May 14, 2013.

(51) Int. Cl.
*F16H 48/06*    (2006.01)
*F16H 48/30*    (2012.01)
(Continued)

(52) U.S. Cl.
CPC ............ *F16H 48/08* (2013.01); *B60K 17/16* (2013.01); *B60K 17/34* (2013.01); *B60K 17/35* (2013.01);
(Continued)

(58) Field of Classification Search
USPC .................................................. 475/233, 238
See application file for complete search history.

(56) References Cited

U.S. PATENT DOCUMENTS 4,389,909 A * 6/1983 Goscenski, Jr. ........ F16H 48/08
475/231
4,679,463 A * 7/1987 Ozaki .................... B60K 23/04
475/231

(Continued)

FOREIGN PATENT DOCUMENTS

CN    1721721 A    1/2006
CN    102713358 A    10/2012
(Continued)

OTHER PUBLICATIONS

Written Opinion & International Search Report for PCT/US2014/038001 dated Nov. 13, 2014, 11 pages.
(Continued)

*Primary Examiner* — Robert A Siconolfi
*Assistant Examiner* — Ryan Dodd
(74) *Attorney, Agent, or Firm* — Jennifer M. Brumbaugh; Reising Ethington P.C.

(57) ABSTRACT

A vehicle differential disconnect assembly can include a differential case, a differential gear set, and a torque distribution device. The differential gear set is carried within the differential case. The torque distribution device transfers torque between the differential gear set and side shafts of the accompanying vehicle driveline. The torque distribution device can include a clutch pack and an actuator assembly. The clutch pack is located at a first side of the differential case relative to the differential gear set, and the actuator assembly is located at a second side of the differential case relative to the differential gear set. The actuator assembly has a mover that transmits movement to the clutch pack when the actuator assembly actuates and deactuates the clutch pack.

21 Claims, 5 Drawing Sheets

(51) Int. Cl.

| | | |
|---|---|---|
| *F16H 48/20* | (2012.01) | |
| *F16H 48/08* | (2006.01) | |
| *F16D 13/52* | (2006.01) | |
| *F16D 23/12* | (2006.01) | |
| *B60K 17/35* | (2006.01) | |
| *B60K 17/16* | (2006.01) | |
| *B60K 17/34* | (2006.01) | |
| *F16H 48/22* | (2006.01) | |
| *F16H 48/34* | (2012.01) | |
| *F16D 28/00* | (2006.01) | |
| *B60K 23/08* | (2006.01) | |
| *B60K 5/02* | (2006.01) | |
| *B60K 5/04* | (2006.01) | |
| *B60K 5/00* | (2006.01) | |

(52) U.S. Cl.
CPC .......... *B60K 23/08* (2013.01); *B60K 23/0808* (2013.01); *F16D 13/52* (2013.01); *F16D 23/12* (2013.01); *B60K 5/02* (2013.01); *B60K 5/04* (2013.01); *B60K 2005/006* (2013.01); *B60K 2023/0825* (2013.01); *B60K 2023/0858* (2013.01); *F16D 28/00* (2013.01); *F16D 2023/123* (2013.01); *F16H 48/22* (2013.01); *F16H 48/30* (2013.01); *F16H 48/34* (2013.01)

(56) References Cited

U.S. PATENT DOCUMENTS

| | | | | |
|---|---|---|---|---|
| 4,919,008 A | * | 4/1990 | Goscenski, Jr. | F16H 48/08 475/234 |
| 4,934,213 A | * | 6/1990 | Niizawa | F16H 48/08 475/239 |
| 5,080,640 A | * | 1/1992 | Botterill | F16H 48/295 475/150 |
| 5,279,401 A | * | 1/1994 | Stall | F16H 48/08 192/52.4 |
| 6,537,172 B1 | * | 3/2003 | McAuliffe, Jr. | F16H 48/22 475/150 |
| 6,790,154 B1 | * | 9/2004 | Kelley, Jr. | B60K 17/35 180/249 |
| 6,827,663 B2 | * | 12/2004 | Tucker-Peake | B60K 17/356 192/84.6 |
| 6,945,899 B2 | | 9/2005 | Peura | |
| 7,001,303 B1 | | 2/2006 | Peura | |
| 7,357,748 B2 | | 4/2008 | Kelley, Jr. | |
| 2002/0032096 A1 | | 3/2002 | Gassmann | |
| 2003/0199359 A1 | | 10/2003 | Tucker-Peake | |
| 2005/0148424 A1 | * | 7/2005 | Kushino | F16H 48/10 475/249 |
| 2007/0259750 A1 | * | 11/2007 | Kramer | F16D 13/52 475/221 |
| 2010/0062891 A1 | | 3/2010 | Ekonen et al. | |
| 2010/0084210 A1 | | 4/2010 | Martus et al. | |
| 2012/0289373 A1 | | 11/2012 | Van Der Hardt Aberson et al. | |

FOREIGN PATENT DOCUMENTS

| | | |
|---|---|---|
| DE | 10310713 A1 | 9/2003 |
| EP | 0066449 A1 | 12/1982 |
| GB | 2227069 A | 7/1990 |
| JP | 2003287106 | 10/2003 |
| WO | WO2009038909 A1 | 3/2009 |

OTHER PUBLICATIONS

EP Extended Search Report for EP Application No. 14798601.2 dated Feb. 6, 2017 (6 pages).
CN Office Action for CN Application No. 201480028156.9 dated Apr. 1, 2017 (8 pages).

\* cited by examiner

VEHICLE DIFFERENTIAL DISCONNECT ASSEMBLY

REFERENCE TO RELATED APPLICATIONS

This application claims the benefit of U.S. Provisional Application Ser. No. 61/823,280 filed on May 14, 2013, the entire contents of which are incorporated herein by reference.

TECHNICAL FIELD

The present disclosure relates generally to a differential for an all wheel drive (AWD) torque transfer coupling and differential gear set, which may provide a serial torque flow configuration.

BACKGROUND

Differential drives are generally known in the motor vehicle industry. Differential drives are used in conjunction with the transmission and drive shaft or propeller shaft (prop shaft) to turn the automotive vehicle wheels at different speeds when the vehicle is going around a curve, in order to differentiate the speed of each wheel individually, and to provide the proper amount of torque to each wheel in slipping, turning, or other road-to-wheel conditions.

In a traditional torque on demand drive train layout of an automotive vehicle there is a primary driven front/rear axle, and a secondary driven "hang on" axle that is connected via a prop shaft or drive shaft and a torque transfer coupling to the primary driven axle. The torque transfer coupling is usually directly in front of and upstream of the secondary driven axle. The axle differential creates the division of power (or torque) to each side shaft of the axle. The primary driven axle can also include a differential which divides necessary power to the side shaft of each front axle shaft and then the wheels. The division of torque between the front and rear axle is completed by the torque transfer coupling which is typically a separate unit on the drive train system and requires space for its housing and other related parts. In a known traditional configuration, a torque transfer coupling for an automotive vehicle is located between the primary and secondary driven axles of the vehicle and, may include a friction clutch pack which is loaded via a ball ramp mechanism. The ball ramp mechanism may be engaged by an electric motor. An electronic control unit senses slip conditions of the wheels, monitors current driving conditions of the vehicle and applies a current to the electric motor which will engage the clutch via the ball ramp mechanism and distribute torque to each wheel as necessary.

An active torque transfer system may provide maximum flexibility in the distribution of torque between the axles of an all-wheel or four-wheel drive automotive system. A similar system can be used in applying torque within an axle on a side-to-side basis between a left rear wheel and a right rear wheel. Other devices currently used in the art for active torque transfer include an electromagnetically engaged pilot clutch to drive a ball ramp mechanism. This mechanism loads the main clutch via electromagnetically engaged pilot clutches. Most of the systems use a ball ramp mechanism but use different engagement mechanisms to engage the ball ramp mechanism to the clutch unit.

SUMMARY

In at least some implementations, a vehicle differential disconnect assembly may include a differential case, a differential gear set, and a torque distribution device. The differential gear set is carried within the differential case. The torque distribution device transfers torque between the differential gear set and the side shafts of the accompanying vehicle in which the differential disconnect assembly is installed. The torque distribution device includes a clutch pack and an actuator assembly. The clutch pack is located at a first side of the differential case with respect to the differential gear set. The actuator assembly is located at a second side of the differential case with respect to the differential gear set. The actuator assembly has a mover that transmits movement to the clutch pack when the actuator assembly actuates and deactuates the clutch pack. The mover spans the first and second sides between the clutch pack and the actuator assembly.

In other implementations, a vehicle differential disconnect assembly may include a differential case, a differential gear set, and a torque distribution device. The torque distribution device includes a clutch pack and an actuator assembly. The clutch pack is located on one side of the differential gear set, while the actuator assembly is located on another side of the differential gear set. The actuator assembly has a mover and a reaction collar. The mover transmits movement to the clutch pack when the actuator assembly actuates the clutch pack. The mover has a first end engaged upon actuation of the clutch pack. The mover also has a second end engaging the clutch pack upon actuation of the clutch pack. The mover extends between the first and second ends, and traverses the differential gear set between the first and second ends. The reaction collar receives reaction loads generated upon actuation of the clutch pack, and transmits the reaction loads to a housing structure of the vehicle differential disconnect assembly.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are examples and are not intended to be exhaustive or otherwise limit or restrict the claims to the precise forms and configurations shown in the drawings and disclosed in the following detailed description.

DETAILED DESCRIPTION

Figure 1:
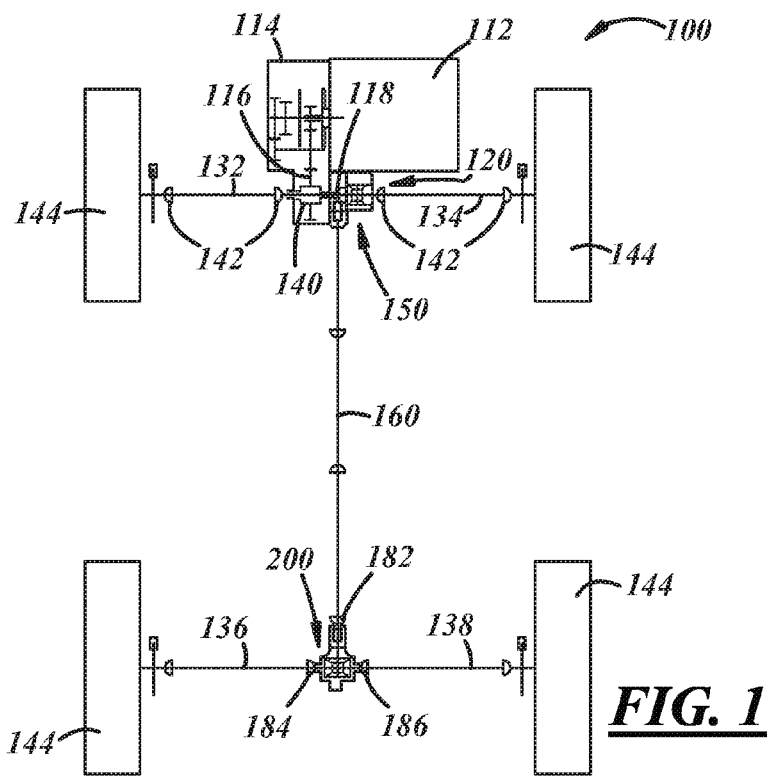
FIG. 1 is a schematic depiction of a vehicle drivetrain system.

Referring now to FIG. 1, a vehicle drivetrain assembly 100 is illustrated such as one suitable for an automobile. The vehicle drivetrain assembly 100 has a transversely mounted engine 112 and a transmission 114. The vehicle drivetrain assembly 100 may include a plurality of shaft elements 132, 134, 136, 138 and corresponding articulating torque transfer joints, which are illustrated as constant velocity joints 142. However, other types of joints may be used, such as, but not limited to universal, tripod, cardan, double cardan, and plunging constant velocity joints. The shaft elements 132, 134, 136, 138, and joints 142 may be used to transmit torque from both a primary power transfer unit (PTU) 150 and the transmission 114 to a plurality of wheels 144. Generally, the engine 112 may be affixed to the transmission 114 through an engine crankshaft (not shown) that is fixed to a transmission input shaft (not shown) to provide torque to the transmission 114. The torque may be transmitted through a series of gears within the transmission 114 and ultimately to a transmission output shaft 116 that may be at a parallel offset from a transmission input shaft. At the transmission output, the transmission 114 may be affixed directly to the PTU 150, or a differential 140 may be utilized between the transmission 114 and the PTU 150—this may depend on the architecture and position of the transmission 114. The PTU 150 may be rotatively connected to the transmission output shaft 116 through an input shaft 118. The first front shaft 132 is generally configured to extend from the transmission 114, which may include the differential 140, or it may be positioned within the input shaft 118 to extend exteriorly from one end of the PTU 150. And the second front shaft 134 may extend from an opposite end at a front output side 120 of the PTU 150. Additionally, the primary PTU 150 may include an output to transmit torque to an integrated differential disconnect assembly 200 of a rear drive unit (RDU) to drive the rear wheels 144 through a propeller shaft 160. The differential disconnect assembly 200 may include an input 182, a first output 184 configured to transmit torque to one of the wheels 144 through the first rear shaft 136, and a second output 186 configured to transmit torque to another wheel 144 through the second rear shaft 138.

Figure 9:
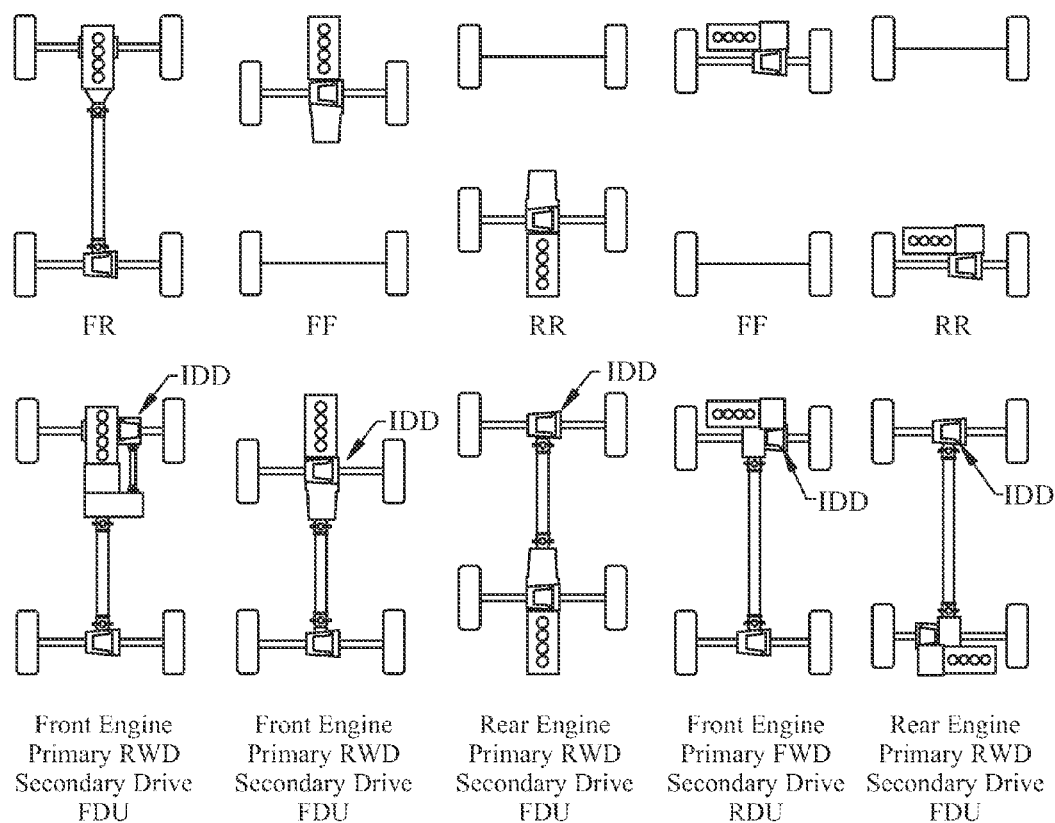
FIG. 9 illustrates alternative layouts of vehicle driveline assemblies.

It should be understood that the vehicle drivetrain 100 is merely an example and that the differential disconnect assembly 200 is not limited to any particular drivetrain arrangement. Indeed, the differential disconnect assembly 200 may be employed in other, alternative drivetrain arrangements. Some examples of such arrangements are depicted in FIG. 9. More specifically, arrow IDD indicates where in the various arrangements that a differential disconnect assembly like the one detailed in this description may be employed. As evidenced by FIG. 9, the differential disconnect assembly 200 may be installed and utilized in connection with either rear drive units (RDU) or front drive units (FDU), and can hence be a front differential or a rear differential in a vehicle drivetrain.

Figure 2:
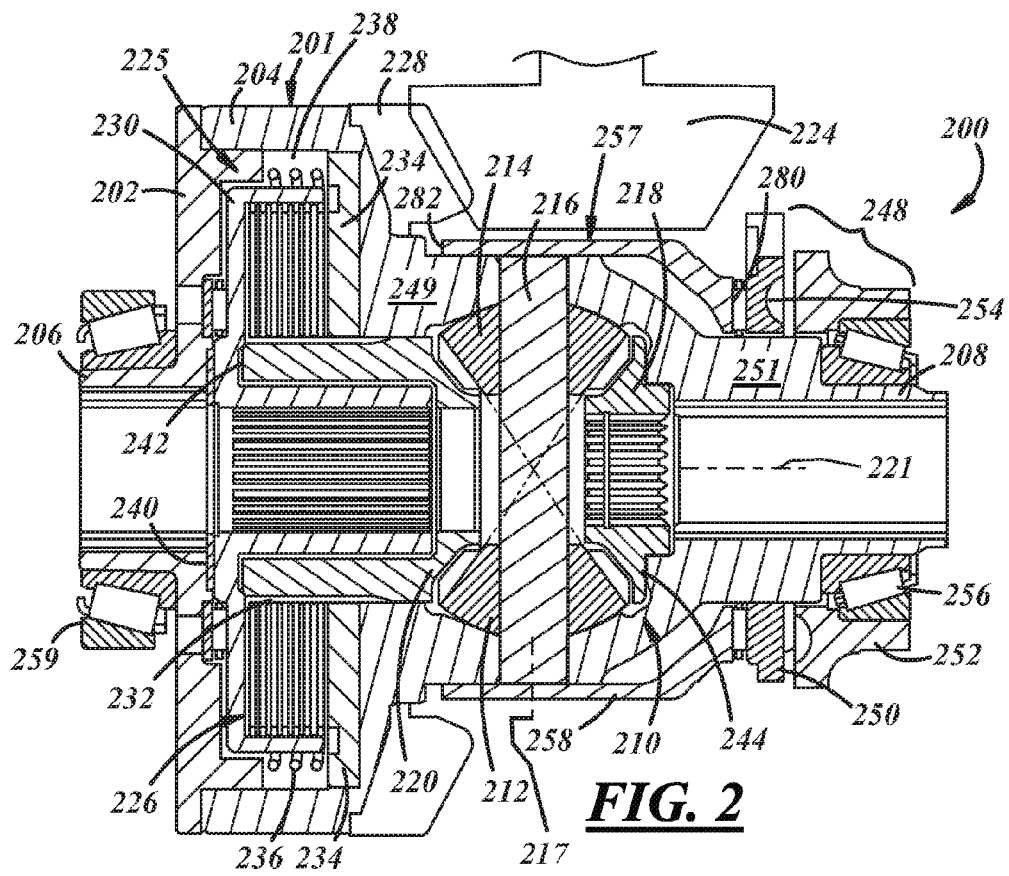
FIG. 2 is a cross section view of a differential arrangement.

Referring to FIG. 2, details of the differential disconnect assembly 200 will now be described. In one sense, the differential disconnect assembly 200 constitutes a side-shaft disconnect device since it is capable of disconnecting torque transfer at the rear shafts 136, 138. The differential disconnect assembly 200 can make up one part of a larger all wheel drive (AWD) disconnect system that may include other disconnect devices at other locations in the accompanying vehicle drivetrain and driveline. These types of AWD disconnect systems are employed for fuel efficiency gains and other improvements. But of course the differential disconnect assembly 200 need not necessarily be part of an AWD disconnect system and can be used for another functionality and another purpose in a particular vehicle drivetrain. FIG. 2 illustrates a cross section through the differential disconnect assembly 200. The differential disconnect assembly 200 includes a differential case 201 that may include first and second differential case members 202, 204 that are discrete pieces mounted together in assembly. The first differential case member 202 includes a bushing 206 configured to receive the first rear shaft 136. The second differential case member 204 includes a bushing 208 configured to receive the second rear shaft 138.

Within the differential case 201, a differential gear set 210 is rotatably arranged and supported. The differential gear set 210 generally includes two differential bevel gears 212, 214 that are rotatably arranged on a bearing pin 216. The bearing pin 216 has an axis 217 that forms a rotational axis for the differential gears 212, 214. First and second differential side shaft gears 218, 220 are arranged around a rotational axis 221 so as to be rotatable relative to the differential case 201. The rotational axis for the differential side shaft gears 218, 220 intersects the rotational axis for the differential gears 212, 214 within the differential case 201. In the implementation shown, the rotational axis 221 for the differential side shaft gears 218, 220 is perpendicular to the rotational axis 217 for the differential gears. Further, an imaginary plane may include the axis 217 and be perpendicular to the axis 221. The differential side shaft gears 218, 220 may be supported against interfaces of the differential case 201 and may have a supporting disc (not shown) arranged therebetween. The propeller shaft or drive shaft 160 (FIG. 1) engages the differential case 201 via a driving gear 224. The driving gear 224 may be any suitable drive pinion gear, such as, for example, one of a hypoid, spiral bevel, or helical gear.

In this embodiment, a torque distribution device is located within the differential case 201 and engages the differential gear set 210. More specifically, the torque distribution device will connect one of the differential side shaft gears 218, 220 with one of the rear side shafts 136, 138. The torque distribution device can function to transfer torque to the first and second rear side shafts 136, 138 for accommodating various automotive driving situations such as cornering, reducing drag, and increasing tractive effort. The functionality is typically managed by an electronic control unit (ECU) or another type of controller. The torque distribution device can have different designs and constructions depending upon, among other possible influences, the design and construction of the differential disconnect assembly in which the torque distribution device is installed. In the embodiment of the figures, the torque distribution device includes a clutch mechanism 225 with a clutch pack 226. Compared to known devices, the friction clutch pack 226 is located in a larger radial diameter section of the differential case 201, behind a drive ring gear 228 to which the driving gear 224 directly engages and drives. This section is larger and has a greater diametric extent than an opposite side of the differential case 201 because the section accommodates the drive ring gear 228 which is typically mounted at an outside of the differential case and has a larger diameter than most, if not all, portions of the differential case. Because of this location, the overall diameter of the friction clutch pack 226 can be maximized, if desired, and hence the associated transmitted torque can also be maximized these enhancements may be beneficial in some applications.

The clutch mechanism 225 in this embodiment includes a first end housing 230 and an inner hub 232 of the side shaft gear 220. The clutch mechanism 225 further includes a clutch reaction plate 234 disposed on one side of the friction clutch pack 226. A return spring 236 is positioned around the end housing 230 within a gap 238 formed axially between an end face of the first differential case member 202 and an end face of the clutch reaction plate 234. The gap 238 is an annular and circumferential spacing in this embodiment, and the return spring 236 is a helical spring. The return spring 236 directly engages the clutch reaction plate 234 at this location. Other spring types are possible. The return spring 236 is so positioned to provide the largest gap in the clutch pack 226 during a disconnected mode (i.e., directly on the clutch reaction plate 234).

Differential gear set axial washers 240, 242, 244 may also be provided. More specifically, the first washer 240 may be positioned between the first differential case member 202 and the first end housing 230. The second washer 242 may be positioned between the first end housing 230 and an end face of the of the side shaft gear 220. The third washer 244 may be positioned between the supporting disc and an inner surface of the second differential case member 204.

Still referring to FIG. 2, an actuator assembly 248 is positioned about the second differential case member 204. The actuator assembly 248 is located on an opposite side of the differential disconnect assembly 200 than the clutch pack 226. In other words, the clutch pack 226 is located at a first side 249 of the differential disconnect assembly 200 with respect to the differential gear set 210, while the actuator assembly 248 is located at a second side 251 of the differential disconnect assembly 200 with respect to the differential gear set 210. With the bearing pin 216 or the previously mentioned imaginary plane serving as a partition into and out of the page in FIG. 2, the first side 249 is defined to the left of the partition, and the second side 251 is defined to the right of the partition. Put another way, the first side 249 is the section of the differential disconnect assembly 200 outputting torque to the rear side shaft 136, while the second side 251 is the section of the differential disconnect assembly outputting torque to the rear side shaft 138. The actuator assembly 248 is disposed on a smaller radial diameter section of the differential case 201 in order to optimize packaging. Packaging demands in powertrain/driveline applications are oftentimes inflexible.

Figure 5:
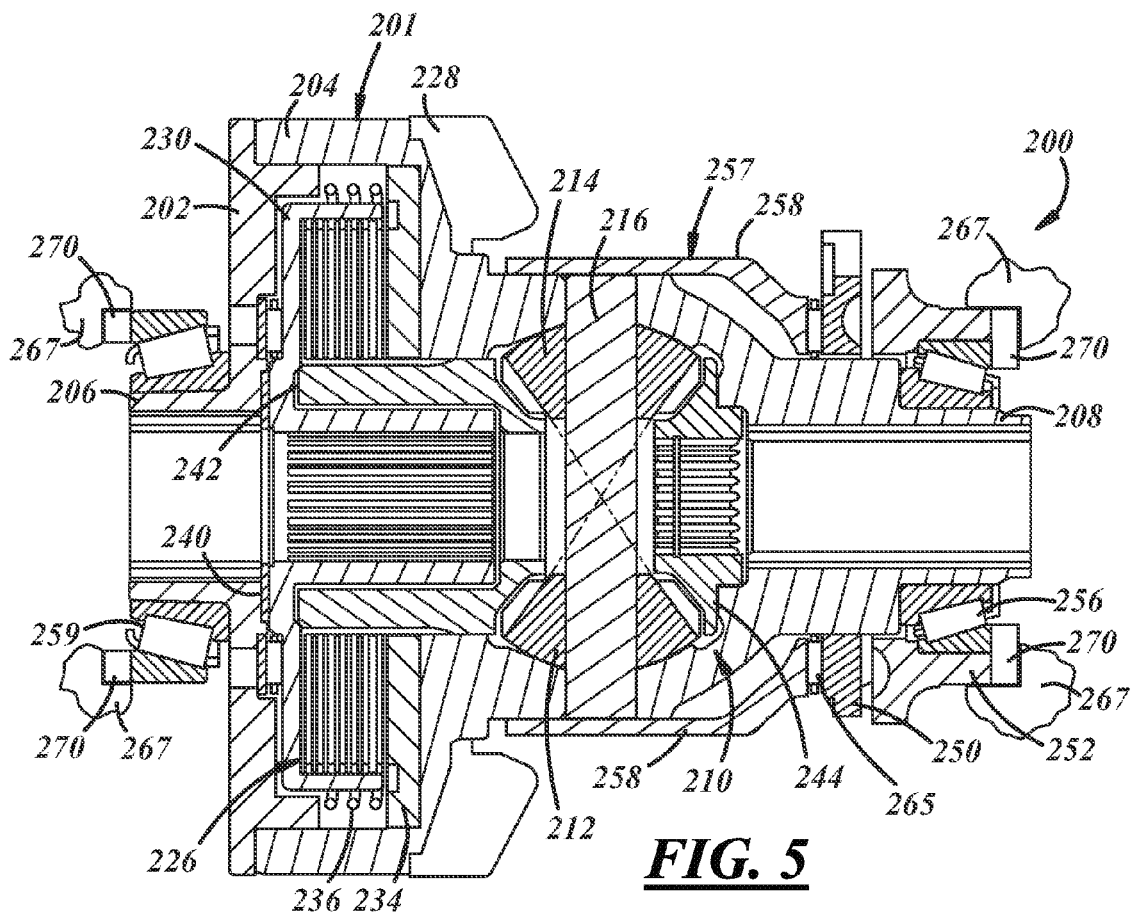
FIG. 5 is a cross section view of the differential arrangement with an actuator and bearings installed.

In this embodiment, the actuator assembly 248 includes an actuator plate 250 and a reaction collar 252 that are configured with a plurality of ball ramp profiles 254 (only one ball ramp profile is depicted) that cooperates with balls (not shown) and/or a ball cage (not shown). One example mechanism that may be employed in one embodiment as part of the actuator assembly 248 is disclosed in U.S. Pat. No. 6,571,928 originally assigned to GKN Automotive, Inc. The actuator assembly 248 can also include an electric motor drive that rotates the actuator plate 250, or can include another technique known to skilled artisans for imparting rotation to the actuator plate 250. The actuator plate 250 is configured for axial linear movement on the second differential case member 204. The reaction collar 252 is fixed to a larger housing structure 267 (FIG. 5) that supports and houses and can surround the differential disconnect assembly 200. The housing structure 267 can be composed of aluminum or cast iron, and need not necessarily present corners that hug the ends of the differential disconnect assembly 200 as depicted in FIG. 5. The reaction collar 252 does not rotate and does not move linearly in operation by its fixed attachment to the housing structure 267. The reaction collar 252 is configured to permit rotational movement of the second differential case member 204 by virtue of a bearing 256. In one exemplary arrangement, the bearing 256 (and bearing 259, introduced below) can be a taper bearing, an angular contact bearing, or another type of bearing. As may be observed in FIG. 2, the bearing 256 is nested radially-inwardly within the reaction collar 252, thereby minimizing the overall packaging space occupied by these structures. The actuator plate 250 rotates and slides linearly in operation, and, via interaction with the ball ramp profiles 254 and balls, imparts linear movement to a mover 257. In the embodiment of the figures, the mover 257 is presented in the form of a differential actuator pressure tube 258 having a cylindrically shaped structure. The differential actuator pressure tube 258 transmits movement from the actuator assembly 248 to the clutch mechanism 225, and transfers axial load from the actuator side of the differential disconnect assembly 200 to the clutch reaction plate 234.

Figure 6:
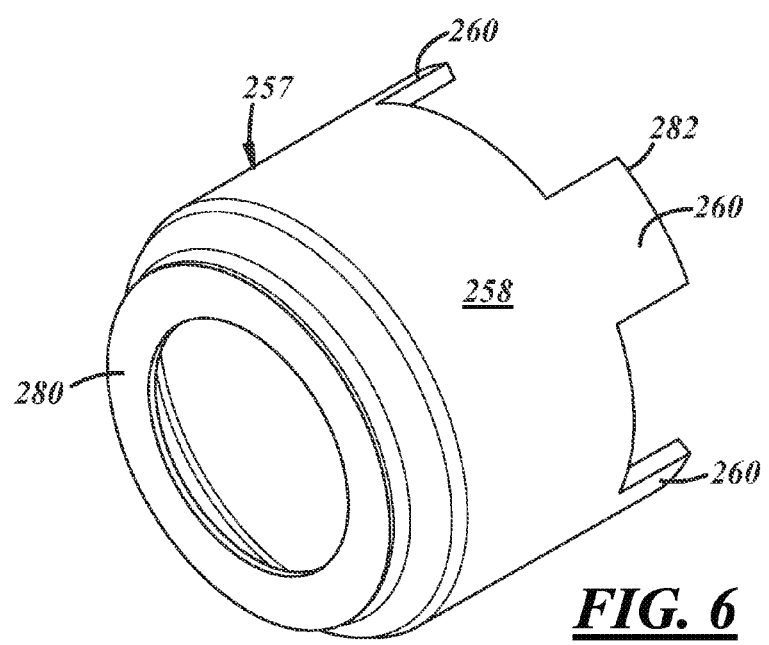
FIG. 6 is a perspective view of a mover in the form of a pressure tube that can be used with the differential arrangement.
Figure 7:
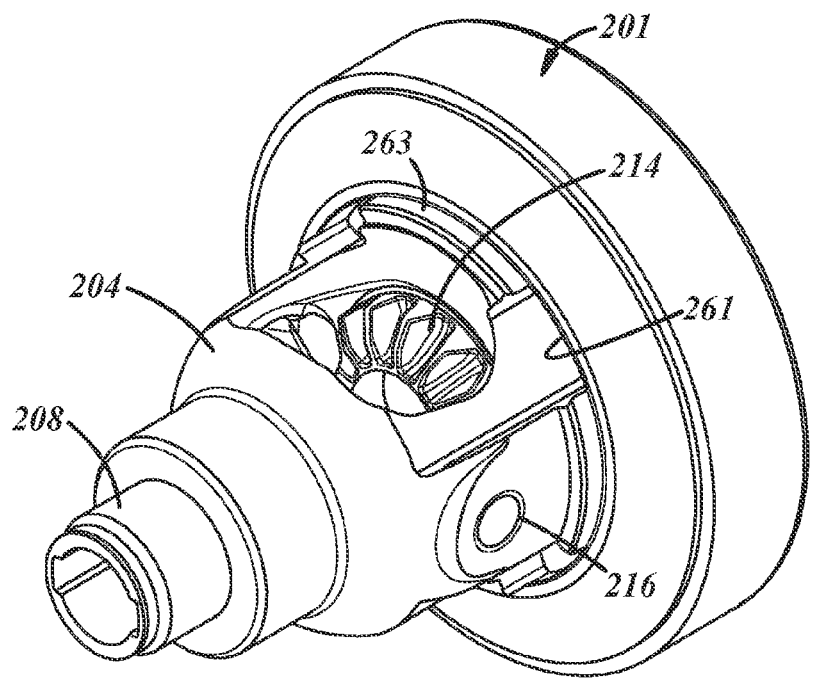
FIG. 7 is a perspective view of the differential arrangement.
Figure 8:
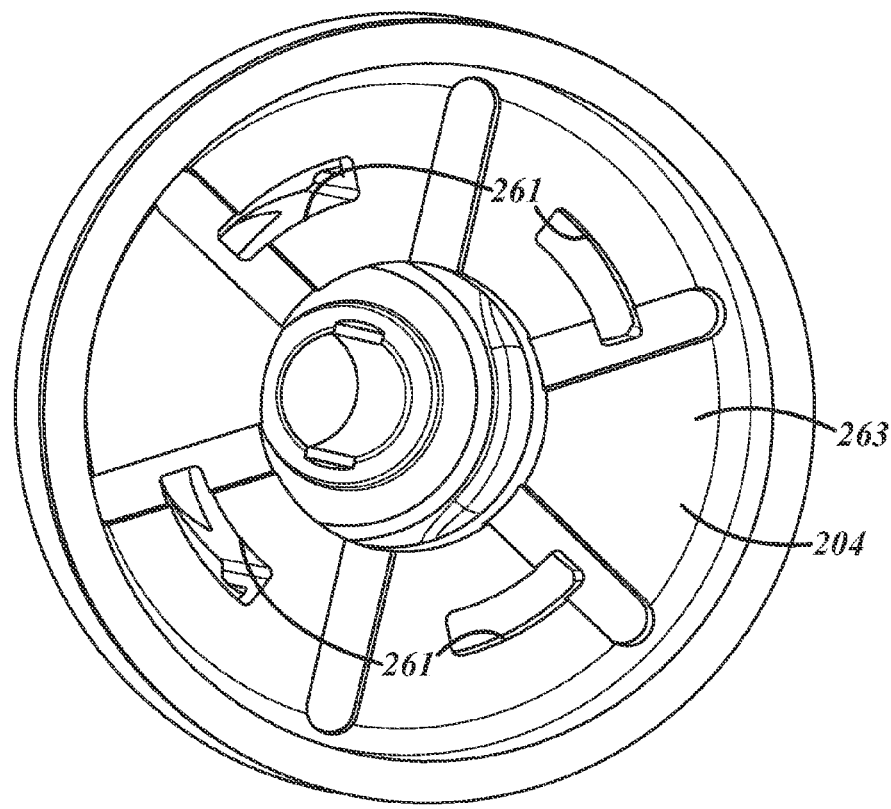
FIG. 8 is an end view of a differential case member that can be used with the differential arrangement.

Referring now to FIG. 6, the differential actuator pressure tube 258 has a one-piece body that extends axially relative to its cylindrical shape from a first end 280 to a second end 282. The first end 280 is engaged directly by the actuator plate 250 in operation, and the second end 282 directly engages the reaction plate 234 in operation. As shown in FIG. 5, the first end 280 can be engaged by a bearing 265 placed between the first end 280 and the actuator plate 250; this arrangement still constitutes "direct" engagement between the first end 280 and the actuator plate 250. The first end 280 is an open end for accommodating components of the differential disconnect assembly 200 at the second side 251, and the second end 282 also is an open end for accommodating components of the differential disconnect assembly 200 at the first side 249. The extent of the differential actuator pressure tube 258 spanning between the first and second ends 280, 282 traverses the differential gear set 210 in assembly (this traversal is perhaps best depicted in FIG. 2)—in other words, the differential actuator pressure tube 258 spans across, overlaps, and surrounds the differential gear set 210 when it is assembled. As it spans across the differential gear set 210, the cylindrical structure of the differential actuator pressure tube 258 may partially or entirely support and hold the installment of the bearing pin 216. In this case, ends of the bearing pin 216 abut directly against an inner surface of the differential actuator pressure tube 258, and the bearing pin 216 is therefore held in place inside of the differential actuator pressure tube 258. This may mean that additional fixation by circlips, dowel pins, screws, or roll-press pins is not required, which is common in previously-known constructions; of course, additional fixation may be employed in some embodiments. Further, the differential actuator pressure tube 258 can include one or more projections in the form of fingers 260 at the second end 282. The fingers 260 are configured to fit within mating openings in the form of slots 261 of a wall 263 of the second differential case member 204 (as shown in FIGS. 7 and 8) and mate with the clutch reaction plate 234. When provided, terminal ends of the fingers 260 directly engage the clutch reaction plate 234.

This arrangement permits axial loading of the clutch pack 226, thereby increasing differential stiffness and allowing for reduced bearings 256. That is, as the actuator assembly 248 actuates, axially-directed load and movement is transmitted through the actuator plate 250, to the differential actuator pressure tube 258, and then to the clutch reaction plate 234—all of which causes the clutch pack 226 to compress. The axially-directed load continues to the first end housing 230, to the first differential case member 202, to a bearing 259, and to final drive gear set shims 270 at the bearing 259. These final drive gear set shims 270, in turn, transmit the axially-directed load to the housing structure 267. Furthermore, the attendant reaction load is transmitted to the reaction collar 252 and then to final drive gear set shims 270 abutting the reaction collar 252. These final drive gear set shims 270, in turn, transmit the reaction load to the housing structure 267. Since the axially-directed load and reaction load generated from actuation are transmitted to the housing structure 267 in this way, it has been found that in some circumstances the use of a smaller-sized bearing 256 may be employed.

As perhaps illustrated best by FIG. 5, by its location the reaction collar 252 retains the position of the bearing 256. Because of this, any radially-directed loading experienced by the differential disconnect assembly 200 is transmitted through the bearing 256, to the reaction collar 252, and then to the housing structure 267. It has been found that this construction and its load transmissions can in some circumstances permit the use of a smaller-sized bearing 256, such as a smaller-sized taper bearing.

Figure 3:
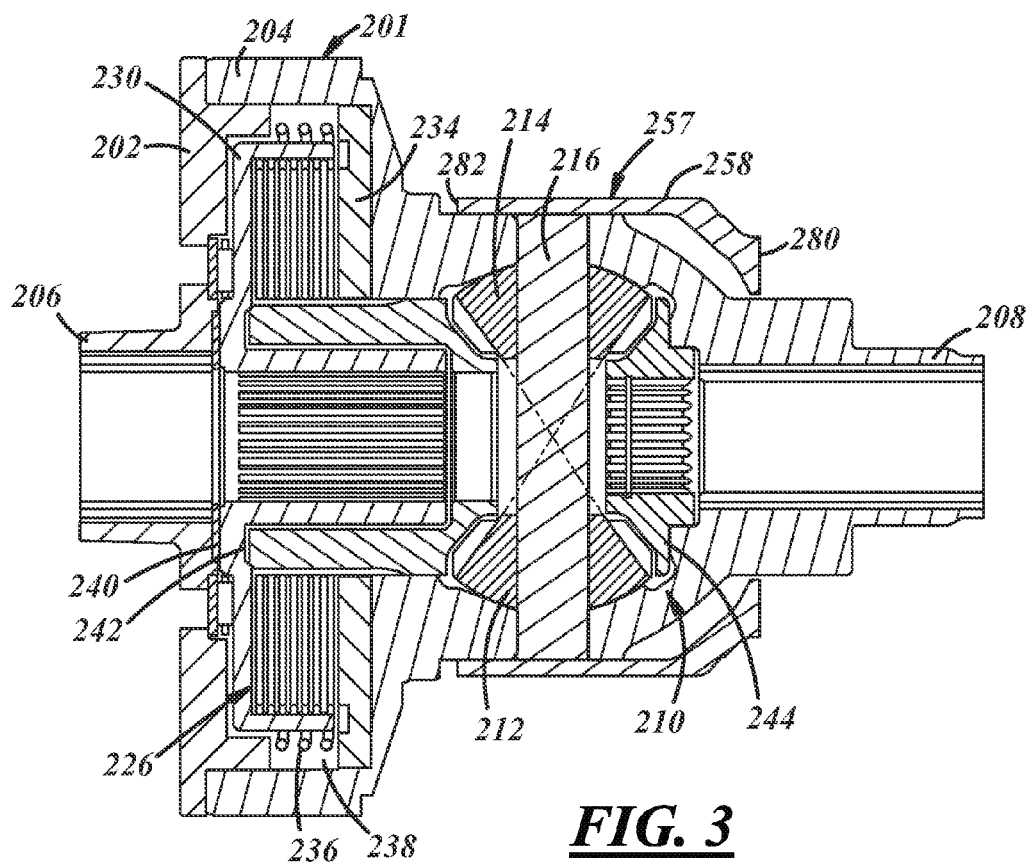
FIG. 3 is a cross section view of the differential arrangement before installing an actuator and before installing a ring gear.
Figure 4:
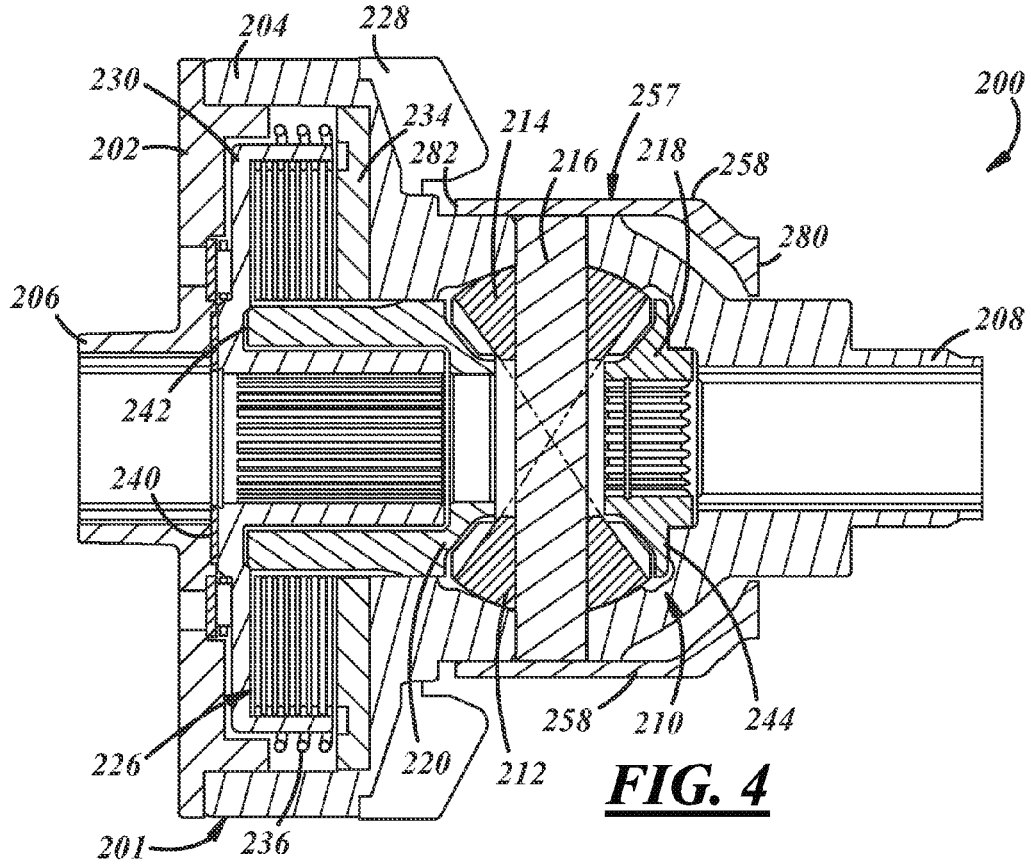
FIG. 4 is a cross section view of the differential arrangement with a ring gear installed.

The assembly shown herein also provides ease of assembly, as well as reduced components. FIGS. 3-5 generally depict the sequence of assembly steps performed in one embodiment. For example, as shown in FIG. 3 illustrates the differential case 201 without the ring gear 228 secured thereto, or the actuator assembly 248 mounted thereon. In FIG. 4, the ring gear 228 is secured before the actuator assembly 248 is mounted. Referring to FIG. 5, the bearings 256 and actuator assembly 248 can then be mounted in place after the securement of the ring gear 228. FIG. 5 illustrates how the actuator assembly 248 moves together with the differential, without requiring a separate shimming process. Final drive gear set bearing axial shims 270 locate in the axial dimension both the differential as well as the actuator assembly 248. Bearings 256 are nested radially inwardly within the reaction collar 252, and the reaction collar 252 therefore helps retain the bearings 256 in place. This arrangement is beneficial in that the bearings 256 need not be assembled until the assembly is connected to the final drive unit. Moreover, the design and construction of the differential disconnect assembly 200 can reduce the number of, and the size of, bearings use in the assembly. For instance, the stiffness imparted by the axial loading of the clutch pack 226 allows the use of a smaller size bearing 256. The design and construction also reduces the overall mass of the differential disconnect assembly 200 by reducing the number of components, or by reducing the size of components as is the case with the bearings. Further, having the bearing 256 nested within the actuator assembly 248 allows for standard differential housing shimming procedures without having to additionally shim the actuator assembly 248 or require additional bearings to support the actuator assembly 248.

The preceding description has been presented only to illustrate and describe some of many possible embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A vehicle differential disconnect assembly, comprising:
a differential case;
a differential gear set carried within said differential case and including a pin having an axis and a pair of differential gears arranged on the pin for rotation about the pin axis; and
a torque distribution device transferring torque between said differential gear set and a side shaft of the vehicle, said torque distribution device including a clutch pack and an actuator assembly including an actuator member that is driven relative to the clutch pack to selectively actuate the clutch pack, said clutch pack located at a first side of said differential case relative to said pin axis, said actuator member of said actuator assembly located at a second side of said differential case relative to said pin axis, said actuator assembly having a mover that is driven by the actuator member to selectively actuate, said mover having a body that extends from said first side of said differential case to said second side of said differential case to transfer movement of the actuator member to said clutch pack, and wherein said torque distribution device includes a return spring facilitating deactuation of said clutch pack, said return spring seated in a circumferential gap located radially outwardly of said clutch pack.

2. The vehicle differential disconnect assembly of claim 1, further comprising a first side shaft gear located at the first side of said differential case, and a second side shaft gear located at the second side of said differential case, said clutch pack located adjacent said first side shaft gear, and said actuator member of the actuator located adjacent said second side shaft gear.

3. The vehicle differential disconnect assembly of claim 1, wherein the first side has a larger diameter section of said differential case and said clutch pack is located in the larger diameter section, and the second side has a smaller diameter section relative to the larger diameter section and said actuator assembly is located in the smaller diameter section.

4. The vehicle differential disconnect assembly of claim 1, further comprising a drive ring gear engaged by a driving gear of a driveline shaft during operation of the vehicle differential disconnect assembly, said drive ring gear carried by said differential case at the first side of said differential case.

5. The vehicle differential disconnect assembly of claim 1, wherein said clutch pack includes a reaction plate and said actuator member of said actuator assembly includes a plate, and, when said actuator assembly actuates said clutch pack, said mover has a first end that is engaged in response to movement of said plate of said actuator assembly toward the mover and the mover has a second end that engages said reaction plate of said clutch pack.

6. The vehicle differential disconnect assembly of claim 5, wherein said differential case has a wall at the first side adjacent said reaction plate with at least one opening defined in said wall, said mover has at least one projection, said at least one projection moves through said at least one opening and engages said reaction plate when said actuator assembly actuates said clutch pack.

7. The vehicle differential disconnect assembly of claim 1, wherein said mover is a generally cylindrical structure that at least partially surrounds said differential gears and spans between the first and second sides and between said clutch pack and said actuator assembly.

8. The vehicle differential disconnect assembly of claim 7, wherein the generally cylindrical structure of said mover at least partially supports said bearing pin via abutment between said mover and said bearing pin.

9. The vehicle differential disconnect assembly of claim 1, wherein said actuator assembly further includes a reaction collar and wherein the actuator member includes a plate, and upon actuation of said actuator assembly, said plate engages said mover, and reaction loads generated during actuation of said actuator assembly are transmitted through said reaction collar and to a housing structure of the vehicle differential disconnect assembly.

10. The vehicle differential disconnect assembly of claim 9, further comprising a bearing located radially inwardly of said reaction collar and at least partly retained at its location via said reaction collar.

11. A vehicle differential disconnect assembly, comprising:
a differential case having a first side and a second side;
a differential gear set including a pin located between the first side and the second side, a pair of differential gears arranged on the pin for rotation about an axis of the pin and a pair of side shaft gears meshed with the differential gears for rotation about a rotational axis different from the axis of the pin; and
a torque distribution device including a clutch pack and an actuator assembly, said clutch pack located on said first side of said differential case, said actuator assembly having an actuator plate located on said second side of said differential case, said actuator plate being movable relative to the clutch pack and said actuator assembly having a mover, said mover being driven by movement of the actuator plate to selectively actuate said clutch pack, said mover having a first end directly engaged by the actuator plate, said mover having a second end engaging said clutch pack upon actuation of said clutch pack, said mover having a portion arranged at the first side of the differential case and a portion arranged at the second side of the differential case wherein said differential case has a wall adjacent said clutch pack with at least one opening defined therein, said mover has at least one projection constituting said second end, said at least one projection moves through said at least one opening and engages said clutch pack upon actuation of said clutch pack.

12. The vehicle differential disconnect assembly of claim 11, wherein said mover at least partially supports an axial end of said pin in an axial direction with respect to said pin.

13. The vehicle differential disconnect assembly of claim 11, wherein said clutch pack is located at a larger diameter section of said differential case, and said actuator assembly is located at a smaller diameter section of said differential case relative to the larger diameter section.

14. The vehicle differential disconnect assembly of claim 11, further comprising a drive ring gear engaged by a driving gear of a driveline shaft during operation of the vehicle differential disconnect assembly, said drive ring gear carried by said differential case on the same side of said differential gear set as the location of said clutch pack.

15. The vehicle differential disconnect assembly of claim 11, wherein said clutch pack includes a reaction plate, said first end of said mover engaged by said actuator plate upon actuation of said clutch pack, and said second end of said mover engaging said reaction plate upon actuation of said clutch pack.

16. The vehicle differential disconnect assembly of claim 11, further comprising a bearing located radially inwardly of said reaction collar and at least partly retained at its location via a reaction collar of said actuator assembly.

17. The vehicle differential disconnect assembly of claim 11, wherein the first end of the mover is located outside of the differential case and the mover overlaps the differential gears from outside the differential case.

18. The vehicle differential disconnect assembly of claim 1, which also includes a pair of side shaft gears mated with the differential gears and arranged for rotation about a rotational axis, and wherein the axis of the pin and the rotational axis of the side shaft gears intersect within the differential case.

19. A vehicle differential disconnect assembly, comprising:
- a differential case;
- a differential gear set including a pin, a pair of differential gears arranged on the pin for rotation about an axis of the pin, and a pair of side shaft gears meshed with the differential gears for rotation about a rotational axis, wherein the axis of the pin and the rotational axis of the side shaft gears intersect within the differential case; and
- a torque distribution device transferring torque between said differential gear set and a side shaft of the vehicle, said torque distribution device including a clutch pack and an actuator assembly, said clutch pack located at a first side of said differential case relative to said pin axis, said actuator assembly having at least a portion located at a second side of said differential case relative to said pin axis, said actuator assembly having a mover that is driven by the actuator assembly to selectively actuate said clutch pack, said mover having a body that engages the clutch pack and which extends from said first side of said differential case to said second side of said differential case to transfer movement of the actuator assembly to said clutch pack, wherein a portion of the mover body is located outside of the differential case and overlaps both the pin and opening from outside of the differential case.

20. The vehicle differential disconnect assembly of claim 19 wherein the pin is received within an opening of the differential case and the mover body overlaps the pin and the opening in which the pin is received.

21. The vehicle differential disconnect assembly of claim 19 wherein the actuator assembly includes an actuator plate and an imaginary plane is defined that includes the axis of the pin and is perpendicular to the rotational axis of the side shaft gears, and the clutch pack is located on a first side of the imaginary plane and the actuator plate is located on a second side of the imaginary plane.

\* \* \* \* \*